United States Patent [19]

Alafandi et al.

[11] 4,192,778

[45] Mar. 11, 1980

[54] RARE EARTH EXCHANGE FAUJASITE ZEOLITE CATALYST CONTAINING SAME AND PROCESS FOR PRODUCING SAME

[75] Inventors: Hamid Alafandi, Woodland Hills; Dennis Stamires, Newport Beach, both of Calif.

[73] Assignee: Filtrol Corporation, Los Angeles, Calif.

[21] Appl. No.: 869,856

[22] Filed: Jan. 16, 1978

Related U.S. Application Data

[63] Continuation-in-part of Ser. No. 808,268, Jun. 20, 1977, Pat. No. 4,164,483, which is a continuation-in-part of Ser. No. 718,166, Aug. 27, 1976, Pat. No. 4,085,069, and a continuation-in-part of Ser. No. 718,167, Sep. 8, 1976, Pat. No. 4,058,484.

[51] Int. Cl.$^2$ ............................................. B01J 29/06
[52] U.S. Cl. ................................. 252/455 Z; 423/112
[58] Field of Search ...................... 252/455 Z; 423/112

[56] References Cited

U.S. PATENT DOCUMENTS 3,173,854   3/1965   Eastwood et al. ............... 252/455 Z

*Primary Examiner*—Carl F. Dees
*Attorney, Agent, or Firm*—Philip Subkow; Bernard Kriegel

[57] ABSTRACT

A rare earth exchanged zeolite of the faujasite type in which the equivalent of Na is less than 0.1 and the rare earth is at least 0.9 equivalents per gram atom of aluminum and catalysts including the same.

14 Claims, No Drawings

RARE EARTH EXCHANGE FAUJASITE ZEOLITE CATALYST CONTAINING SAME AND PROCESS FOR PRODUCING SAME

This application is a continuation-in-part of Application Ser. No. 808,268, filed June 20, 1977, now U.S. Pat. No. 4,164,483 which is a continuation-in-part of Application Ser. No. 718,166 filed Aug. 27, 1976, now U.S. Pat. No. 4,085,069 and of Application Ser. No. 718,167, filed Sept. 8, 1976, now U.S. Pat. No. 4,058,484.

This invention relates to zeolites of the faujasite type including the X and Y zeolite. Such X zeolites are described in U.S. Pat. No. 2,882,244 and the Y zeolite in U.S. Pat. No. 3,216,789 and 3,445,727, Ser. No. 726,948 filed Sept. 27, 1976. The faujasite zeolites of our invention contain rare earth (Re) cations in exchange position in an amount greater than 0.9 equivalents of ReO per gram atom of aluminum and Na expressed as Na of less than 0.1 equivalents per gram atom of aluminum.

These exchange zeolites are useful as cracking catalysts and may be formulated by mixing them with matrices such as is reported in the prior art.

Processes for producing Y zeolites containing such low levels of Na element are discussed in the prior art which is extensive. Illustration of the prior art relating to low sodium zeolites includes Maher et al U.S. Pat. Nos. 3,293,192 and 3,402,996; Hansford 3,354,027; and Sherry 3,677,698.

The techniques for carrying out exchanges in the prior art have been described in the prior art (see Rabo "Zeolite Chemistry and Catalysis", page 309 and 310 published by the American Chemical Society in 1976 and see also U.S. Pat. Nos. 3,293,194, 3,402,996, 3,867,277, 3,281,199, 3,169,692, 3,173,854 and 2,436,608). Such procedure has also been reported when using an X type zeolite (see U.S. Pat. No. 3,966,882). The literature in this art is extremely voluminous and this statement of the art is not intended to be exhaustive but for the purpose of placing the present invention in the historical perspective of this art.

STATEMENT OF THE INVENTION

We have discovered that contrary to the teachings of the prior art, we can produce both X and Y rare earth exchanged zeolites which produce hydrothermally stable zeolites which when used with a matrix produce cracking catalysts of superior activity. This we accomplish by reacting the zeolite with a large excess of rare earth cations to that required to replace the Na in the zeolite and controlling the pH and the temperature of the exchange. By our process we can replace in excess of 90% of the Na cation in the original sodium zeolite without affecting the crystal structure of the zeolite. We have found that the X and Y zeolite will, when used as a substrate, give superior cracking catalysts.

We have found that by the process of our invention we may cause the aforesaid reduction in the sodium content of the zeolite, and also this occurs without any substantial change in the crystallinity either in lattice constant or the degree of crystallinity of the particular zeolite being exchanged. The X zeolites have a cubic lattice of $a_o$ in the range of 25–24.86 A for $SiO_2/Al_2O_3$ ratios in the range of 2–3 and Y zeolites have a cubic lattice of $a_o$ in the range of less than 24.86 up to 24.59 A for $SiO_2/Al_2O_3$ ratios above 3 and up to about 6.1.

The exchanged X or Y zeolites produced by the process of our invention have substantially increased hydrothermal stability and when incorporated into matrices in place of zeolites of the prior art of like Na content, will result in catalysts of much greater hydrothermal stability to give superior S+ activities.

We accomplish this result by exchanging the zeolite of the faujasite type by a process of hydrothermal exchange of the sodium in the faujasite zeolite at a temperature far in excess of the temperatures of the boiling point of the reaction solution at atmospheric pressure. This temperature is attained by maintaining the reaction mixture in the exchange solution at superatmospheric pressures. The resultant zeolite is incorporated into a matrix as will be described below.

In the process according to our invention, the sodium zeolites of the faujasite type are mixed with a solution of a salt of the rare earth cation to be exchanged for the sodium of the zeolite and the exchange process is carried out at superatmospheric pressure so as to cause the exchange to occur at temperatures above 300° F. and preferably not more than about 500° F. We have also found that in order to produce the zeolites of low sodium level, for example, in the range of 1% or less, expressed as $Na_2O$ based upon the weight of the volatile free (VF) zeolite without a substantial destruction of the crystallinity of the zeolite, it is desirable to maintain a high ratio of the equivalents of the rare earth cation to the sodium in the zeolite.

The temperature should be above 300° F., and less than 500° F. and preferably between 350° F. and 450° F., and the ratio of the equivalents of rare earth cation, in the solution employed, to the equivalents of sodium originally in the zeolite charged to the reaction mixture, depends on the level of the residual Na. We prefer to carry out the reaction for exchange to levels of Na as $Na_2O$ of about 1% or less, within the range in excess of one equivalent of rare earth oxide per equivalent of sodium ion in the sodium zeolite employed in the reaction mixture. We may obtain this ratio by adjusting the concentration of the zeolite solids in the reaction mixture and the concentration of the rare earth salt.

We have also found that it is desirable to carry out the exchanged in an acid condition, suitably a pH in the range of from 5 to about 6.

Under these conditions we have been able to obtain an X and Y zeolite having the silica to alumina ratio and $a_o$ characteristic of the X and Y zeolites respectively as herein described, with sodium expressed as $Na_2O$ based on the exchanged zeolite, volatile-free for example, from less than 1% and preferably less than 0.8%, for example less than 0.5%. The process does not result in any substantial impairment of the crystallinity of the exchanged zeolite.

The crystallinity of the exchanged zeolite was substantially the same as the crystallinity of the sodium X or Y as evidenced by their X-ray patterns with substantially the same $a_o$ value as the X or Y entering the exchange process. The resultant product shows excellent thermal and hydrothermal stability.

We have found that the preferred catalysts are obtained when the rare earth exchange X or Y zeolite contains at least the one, for example 0.9 or more equivalents of ReO and 0.1 or less equivalents of Na per gram atom of aluminum theoretical cation density. Na and Rare earth oxide (ReO) are about 1 or more equivalent per gram atom of aluminum in the exchange product, and preferably when the rare earth cation density is itself of about 1 or more for example between 1 and 2 equivalents per gram atom of aluminum in the exchanged zeolite. The X-ray spectrum of the exchange zeolite shows no separate rare earth compounds. While we do not wish to be bound by any theory, the observed facts are consistent with the view that the rare earth is associated with an exchange site. We have no explanation for this apparent departure from the conventional theory of the zeolite structure and the exchange process.

The catalyst is preferably produced by spray drying a slurry of the above zeolite, the alumina as hydrated alumina and clay, the slurry composition being such as to give a spray dried product of microspheres of about 50 to 70 micron average diameter.

The hydrated alumina in the form of pseudoboehmite is of the type described in copending application, Ser. No. 696,889, now U.S. Pat. No. 4,086,187 whose description is herewith incorporated by this reference. We prefer to use this hydrated alumina prepared as described in said patent.

It may be formulated into a pellet, tablet or extruded form by means well known in the art employing matrixes such as used for catalysts containing exchanged faujasites.

The cracking activity of the catalysts are determined by a Microactivity Test (see Oil and Gas Journal, 1966, Vol. 64, No. 39 p. 84, 85 and Nov. 22, 1971, pp. 60–68).

In order to test the thermal stability of the catalyst, and, therefore, its resistance to the high temperature and steam conditions encountered in commercial cracking operations, it is subjected to high-temperature steam treatment prior to being subjected to the bench-scale tests. Prior to subjecting the catalyst to the above tests, separate samples are steamed at a high temperature. When the temperature of the steaming is 1450° F. for 2 hours, the cracking results are referred to as M activity. When the temperature of the steaming is 1500° F. for 2 hours, the test results are referred to as S activity. When the temperature of steaming is 1550° F. for 2 hours the test results are referred to as S+ activity.

The following examples illustrate the application of the process of our invention to produce polyvalent exchanged Y zeolites.

EXAMPLE 1

Na Y zeolite (13% Na$_2$O and SiO$_2$/Al$_2$O$_3$ ratio of 4.7 and a$_o$ 24.71 A by calculation from X-ray) was exchanged with rare earth sulfate solution at a pH of about 5 to 5.5 employing a ratio of rare earth sulfate expressed as ReO of 19% i.e. 18 grams of ReO (rare earth oxide) per 100 grams of NaY zeolite both volatile-free.

The rare earth sulfate expressed as the rare earth oxide (ReO) analyzed as follows:
La$_2$O$_3$: 57 weight percent
CeO$_2$: 15 weight percent
Nd$_2$O$_3$: 21 weight percent
Pr$_6$O$_{11}$: 7 weight percent The equivalents of rare earth oxide per 100 grams of the rare earth oxide, volatile-free, are 1.896.

The sulfate containing 0.339 equivalents of rare earth oxide (ReO) was mixed with the zeolite and water to produce a dispersion of 10% of the solids (zeolite). The ratio of the equivalents of ReO per equivalent of Na in the zeolite was 0.81 equivalent of ReO per equivalent of Na in the zzeolite. The rate of reaction of the components was such as to maintain the above pH, that is in the range of 5 to 5.5. The mixture was heated for 2 hours at a temperature of 170° to 180° F. and filtered. The filter cake was reslurried in rare earth sulfate solution employing 41.6 grams of ReO and 100 grams of the exchanged zeolite per 3,233 ml. This is equivalent to 4.88 equivalents per equivalent of the Na present in the exchanged zeolite from the low pressure exchange. The mixture is adjusted if necessary to a pH of 5 to 5.5 by addition of lanthanum carbonate, filtered and then heated at 355° F. for 3 hours, filtered hot and the filter cake is then washed.

The filter cake, on a volatile-free basis, analyzed as follows:
SiO$_2$: 53.4% by weight
Al$_2$O$_3$: 20.4% by weight
Na$_2$O: 0.36% by weight
ReO: 23.6% by weight
SO$_3$: 3.32% by weight The zeolite contained 1.09 equivalents of ReO per gram atom of Na and 0.03 equivalents of Na per gram atom of aluminum.

The filter cake was washed sulfate free. It was formulated as an example to produce a catalyst.
Zeolite: 19%
hydrated alumina: 18%
halloysite: 16%
Ball clay: 47%

Tested by the above microactivity test it gave the following results:

|  | M | S | S+ |
|---|---|---|---|
| Conversion % | 75.3 | 75.3 | 63.7 |

EXAMPLE 2

The procedure in all of the following examples for the exchange of the zeolite, except as specified in the example, was carried out as follows:

The X zeolite had the following anhydrous molar composition: Na$_2$O : Al$_2$O$_3$ : 2.5 SiO$_2$ and an a$_o$ of 24.9 A.

500 grams of the above sodium X containing 19.7% Na$_2$O was dispersed at 3,000 milliliters of water. The dispersed zeolite was titrated to a pH of 8.0 with a 25% sulfuric acid solution. The slurry was filtered and washed. A rare earth sulfate solution was prepared by dissolving the above rare earth sulfate in water and diluted to 13,500 milliliters by dilution. The weight of the rare earth sulfate employed is sufficient to provide the amounts specified in each of the following examples. The zeolite filter cake produced was above was dispersed in the rare earth sulfate solution adding it at the rate to maintain the pH in the range of about 5 to 6 as specified in each of the following examples. The mixture was then introduced into the autoclave and heated to the temperature specified in each of the examples for the periods therein specified. After the elapse of time, the slurry was cooled, filtered and washed sulfate free. It may be dried and it may be mixed with the matrix as described below, before or after drying.

EXAMPLE 3

The zeolite exchanged as described in Example 2 was incorporated into a matrix such as has been employed in the prior art commercial catalyst. The matrix was produced as follows:

A hundred grams of hydrate alumina, (pseudoboehmite) was peptized with 1.057 liters of water per hundred grams of alumina to which had been added 9.5 milliliters of 100% formic acid per 1.057 liters with moderate stirring for about thirty minutes. To this mixture was added 309.5 grams of ball clay per 100 grams of alumina on a volatile-free basis and 100 grams of acid-treated halloysite on a volatile-free basis, per 100 grams of alumina referred to above and the mixture was vigorously stirred for about fifteen minutes. To the resultant mixture was added the exchange zeolite produced as above in the proportions as specified in each of the examples with vigorous agitation. The mixture was spray dried to give particles of about 70 micron average diameter and containing about 15% volatile matter.

EXAMPLE 4

The autoclave charge was made up according to the procedure of Example 2. The ratio of the rare earth sulfate to the sodium zeolite on a volatile-free basis was 172.5 grams of rare earth oxides (ReO) to 500 grams of the zeolite. This is equivalent to a dosage of 34.5%, i.e., 34.5 grams of rare earth oxides to 100 grams of zeolite both volatile-free. This is substantially 1 equivalent of ReO per eqivalent of Na in the zeolite. The pH of the slurry prior to autoclaving was adjusted to 5.4 and the slurry was autoclaved at 300° F. for two hours. The exchange zeolite on a volatile-free basis analyzed as follows:

Na$_2$O: 1.84% by weight
ReO: 25.9% by weight
SiO$_2$: 44.3% by weight
Al$_2$O$_3$: 27.7% by weight This is equivalent to 0.109 equivalent of Na per 1 gram atom of aluminum in the product and 0.809 equivalent of ReO per one gram atom of aluminum in the product. The zeolite was incorporated into the matrix according to the procedure of Example 2. The composition of the catalyst on a volatile-free basis was thus 19% of the zeolite, 18% of the alumina, 47% of ball clay and 16% of acid treated halloysite. The micro activity of the catalyst was as follows:

| M | S | S+ |
|---|---|----|
| 49.6% | 30.8% | 18.7% |

EXAMPLE 5

The procedures of Example 2 and 3 were followed. The pH was held at 5.7 and the volume was 3.57 gallons. It was autoclaved for two (2) hours at the temperature ranging from 300° F. to 310° F.

The zeolite analyzed on a volatile-free basis is as follows:

Na$_2$O: 2.03% by weight
ReO: 26.4% by weight
SiO$_2$: 41.6% by weight
Al$_2$O$_3$: 29.4% by weight This is equivalent to 0.12 equivalents of sodium per 1 gram atom of aluminum in the product and 0.87 equivalents of ReO per 1 gram atom of aluminum in the product. The exchange zeolite was incorporated in the matrix according to Example 2, except that the acid treated halloysite was replaced by an equal amount of silica-alumina gel and the micro activity of the catalyst was as follows:

| M | S | S+ |
|---|---|----|
| 76.2% | 57.8% | 29.2% |

EXAMPLE 6

The procedure of Example 5 was followed and the pH in this case and adjusted to 5.2. Duplicate samples of the exchanged zeolite analyzed as follows on a volatile-free basis averaged:

|  | Sample 1 |  | Sample 2 |  |
|---|---|---|---|---|
| Na$_2$O | = 1.84% | and | 1.84% | by weight |
| ReO | = 25.9% | and | 26.3% | by weight |
| SiO$_2$ | = 44.3% | and | 44.2% | by weight |
| Al$_2$O$_3$ | = 27.7% | and | 27.5% | by weight |

The equivalent of sodium was 0.11 sodium per gram atom of aluminum in the product and that of the ReO was 0.90 per gram atom of aluminum in the product. The exchanged zeolite was incorporated in the matrix according with Example 2 and the micro activity of the catalyst was:

| M | S | S+ |
|---|---|----|
| 67.3% | 46.6 | 26.1% |

EXAMPLE 7

The procedure of Example 2 was followed but in this case the dosage was 45% of the rare earth oxide, i.e., 45 grams of the rare earth oxide volatile-free per 100 grams of the sodium X volatile free. This is equivalent to about 1.3 equivalents of ReO per gram atom of Al in the sodium X. The attained pH was 5.3 . The slurry was autoclaved for 4 hours at a temperature ranging from 337° F. to 343° F. The product on a volatile-free basis analyzed as follows:

Na$_2$O=1.34% by weight
ReO=27.6% by weight
SiO$_2$=41.6% by weight
Al$_2$O$_3$=28.7% by weight This is equivalent to 0.076 equivalent of sodium per gram atom of aluminum in the product and 0.924 equivalent of ReO per 1 gram atom of aluminum in the product. The zeolite was incorporated in the matrix according to Example 2 except that the nominal concentration of the zeolite was 20% with a proportionate reduction in the clay component. The micro activity of the catalyst was:

| M | S | S+ |
|---|---|----|
| 65.2% | 47.4% | 30.4% |

Another sample of the exchanged zeolite according to this example was incorporated in the matrix according to Example 2, but in this case the concentration of the zeolite was 25%. The micro activity of the catalyst was as follows:

| M | S | S+ |
|---|---|---|
| 68.5 | 39.9 | 27.4 |

EXAMPLE 8

The procedure of Example 2 was followed but the rare earth salt was cerium chloride ($CeCl_3$). The dosage was 45% as in Example 6 and the pH prior to autoclaving was 6.1 which is within the range of about 6. It was autoclaved for 4 hours at 338° F. The product analyzed on a volatile-free basis as follows:

$Na_2O$ = 0.48% by weight
ReO ($Ce_2O_3$) = 30.2% by weight
$SiO_2$ = 39.9% by weight
$Al_2O_3$ = 30.2% by weight The equivalent of sodium per gram atom of aluminum in the product was 0.025 and for the cerium it was 0.93 per 1 gram atom of aluminum in the product. The zeolite was incorporated in the matrix according to Example 2 except that the concentration of the zeolite was 23% with a proportionate reduction in the clay component and the micro activity was:

| M | S | S+ |
|---|---|---|
| 69.9 | 46 | 29.7 |

EXAMPLE 9

The procedure of Example 8 was followed except that the salt was lanthanum chloride $LaCl_3$. The zeolite on a volatile-free basis analyzed as follows:

$Na_2O$ = 0.48% by weight
ReO ($La_2O_3$) = 29.6% by weight
$SiO_2$ = 40.4% by weight
$Al_2O_3$ = 29.2% by weight The equivalents of sodium per gram atom of aluminum in the product was 0.026 and the equivalents of ReO per gram atom of aluminum in the product was 0.92. The exchanged zeolite was incorporated in the matrix according to Example 7. The micro activity of the catalyst was:

| M | S | S+ |
|---|---|---|
| 68.8 | 63.5 | 33.5 |

EXAMPLE 10

The procedure of Example 2 was followed except that the dosage was 54%, i.e., 54 grams of rare earth oxide volatile-free per 100 grams of sodium X volatile-free. This is equivalent to about 1.6 equivalents of rare earth per gram atom of Al in the sodium X. The pH of the slurry prior to autoclaving was 6.1 and the slurry was autoclaved for four hours at 338° F. The zeolite analyzed as follows:

$Na_2O$ = 0.315% by weight
ReO = 33.5% by weight
$SiO_2$ = 37% by weight
$Al_2O_3$ = 27.5% by weight The equivalent of sodium per gram atom of aluminum in the product was 0.18 and the equivalent of ReO per gram atom of aluminum in the product was 1.17. The zeolite was incorporated in the matrix according to Example 2 in the following proportions; the clay component being adjusted accordingly:

| Sample | a(1) | = | 19% on a volatile-free basis |
|---|---|---|---|
| | a(2) | = | 19% on a volatile-free basis |
| | a(3) | = | 19% on a volatile-free basis |
| Sample | b(1) | = | 22% on a volatile-free basis |
| | b(2) | = | 22% on a volatile-free basis |
| | C(1) | = | 23% on a volatile-free basis |
| | c(2) | = | 23% on a volatile-free basis |
| | c(3) | = | 23% on a volatile-free basis |
| | d(1) | = | 25% on a volatile-free basis |
| | d(2) | = | 25% on a volatile-free basis |

Each of the catalysts were tested for micro activity with the following average results:

| | M | M | S | S+ |
|---|---|---|---|---|
| Sample a(1) | | 69.2 | 62.8 | 32.4 |
| a(2) | | 71.5 | 67.5 | 34.2 |
| a(3) | | 73.7 | 67.5 | 38.5 |
| b(1) | | 69.4 | 60.6 | 33.6 |
| b(2) | | 70.2 | 64.8 | 33.3 |
| c(1) | | 68.8 | 63.5 | 33.5 |
| c(2) | | 69.9 | 51.4 | 29.7 |
| c(3) | | 71.8 | 63.2 | 32.4 |
| d(1) | | 65.9 | 69.2 | 30.4 |
| d(2) | | 73.3 | 65.8 | 38.7 |
| Av | | 70.4 | 63.6 | 33.7 |

The following tables and graphs illustrate the discovery.

TABLE 1

| | Zeolite Composition Equivalents per Grams Atom of Al | | Micro Activity | | |
|---|---|---|---|---|---|
| Example | Na | ReO | M % | g % | S+ % |
| 4 | 0.11 | 0.89 | 49.6 | 30.8 | 18.7 |
| 6 | 0.11 | 0.90 | 67.3 | 46.6 | 26.1 |
| 7 | 0.076 | 0.924 | 65.2 | 47.4 | 30.4 |
| 8 | 0.025 | 0.93 | 69.9 | 46. | 29.7 |
| 9 | 0.026 | 0.92 | 68.8 | 63.5 | 33.5 |
| 10 | 0.018 | 1.17 | 70 | 64 | 34 |

The data of Table 1 which tabulates all examples using the same clay matrix is plotted on FIG. 1 as will be seen by reference to Examples 8 and 9 and Example 7. The lanthanum ion acts similarly to the cerium ion and they both may be classed as ReO cations.

The data of Example 10 shows that within the limits of the experimental data the S+ activity of the exchanged zeolite is independent of concentration of the zeolite in the catalyst in the range of 19 to 25% and the average value of the micro activity for this example is given in Table 2.

It will also be observed that the sum of the equivalents of Na and ReO shows substantially no proton exchange. The S+ activity of the catalyst according to our invention is substantially higher that those of the Class B catalysts which are substantially deactivated when exposed to S+ conditions.

As will be observed from the above Table 1, the S+ activity of catalysts employing zeolites containing various ratios of the equivalents of rare earth to one gram atom of aluminum in the zeolite product there shows an increase in the M,S and S+ activity when the equivalents of ReO per gram atom of aluminum in the product exceeds about 0.9 equivalents of ReO per gram atom of aluminum in the product. The S+ activity rises to the range of about 30 to 35 percent as compared within the range of about 20% for the Y type B catalysts which is in effect the S+ activity of the matrix itself.

The alkaline earth exchanged zeolite may be incorporated into a matrix to produce a cracking catalyst by the procedure described above for the rare earth exchanged zeolite.

Instead of single cation type exchanged zeolites as the zeolite component of the catalyst, we may use zeolites in which part of the sodium is exchanged with for example, $NH_4$, H, Ca and Mg and another part of rare earth cation to reduce the Na component to 1% less for example 0.5% is less $Na_2O$ based on a volatile-free basis.

In the case of the Y zeolite, the presently preferred catalyst is one formulated as above including the $NH_4$ or the rare earth exchanged zeolite, or one which may incorporate both the rare earth and the ammonium cation. In the case of the X zeolite, we prefer to employ the rare earth exchanged zeolite as the catalyst component.

We claim:

1. A composition of matter comprising a zeolite of the faujasite type having in excess of 0.9 equivalents of rare earth cations per gram atom of aluminum in the zeolite and less than 0.1 equivalents of Na per gram atom of aluminum in the zeolite, the cation density composed of Na and rare earth being substantially equal to one equivalent per gram atom of the aluminum in the exchanged zeolite.

2. The composition of claim 1 in which the zeolite is a Y zeolite.

3. The composition of claim 1 in which the cation density is in excess of 1 equivalent per gram atom of aluminum in the zeolite.

4. The composition of claim 3 in which the zeolite is a Y zeolite.

5. The composition of claim 2 in which the equivalents of Na are less than about 0.02 equivalents and the equivalents of rare earth is in excess of 1 per gram atom of aluminum.

6. The composition of claim 5 in which the zeolite is a Y zeolite.

7. A cracking catalyst comprising the exchanged zeolite of claim 1 and a matrix.

8. A cracking catalyst comprising the exchanged zeolite of claim 2 and a matrix.

9. A cracking catalyst comprising the exchanged zeolite of claim 3 and a matrix.

10. A cracking catalyst comprising the exchanged zeolite of claim 4 and a matrix.

11. The cracking catalyst comprising the exchanged zeolite of claim 3 and a matrix in which the zeolite is a Y zeolite.

12. The cracking catalyst comprising the exchanged zeolite of claim 4 and a matrix in which the zeolite is an X zeolite.

13. The process of exchanging a sodium faujasite type zeolite which comprises forming a water slurry of rare earth salts and a zeolite of the faujasite type having and $a_o$ characteristic of zeolites of said type in which the ratio of the equivalents of rare earth cations per gram atom of aluminum in the zeolite being above about 1 and adjusting the pH of the mixture to be at a pH of about 5 to about 6 to form a reaction mixture and heating said adjusted mixture at a superatmospheric pressure and at a temperature of about 250 to 400 to introduce into the zeolite in excess of 0.9 equivalents of rare earth cation per gram atom of aluminum in the exchanged zeolite and washing the exchanged zeolite.

14. The process of claim 13, in which the zeolite is a Y zeolite.

* * * * *